UNITED STATES PATENT OFFICE.

LOUIS C. JONES AND FRED L. GROVER, OF SYRACUSE, NEW YORK, ASSIGNORS TO THE SOLVAY PROCESS COMPANY, OF SOLVAY, NEW YORK, A CORPORATION OF NEW YORK.

PROCESS OF RECOVERING POTASSIUM CHLORID FROM ALKALINE DEPOSITS.

1,215,544.      Specification of Letters Patent.      Patented Feb. 13, 1917.

No Drawing.      Application filed August 30, 1916. Serial No. 117,593.

*To all whom it may concern:*

Be it known that we, LOUIS C. JONES and FRED L. GROVER, citizens of the United States, residing at Syracuse, in the county of Onondaga and State of New York, have invented a new and Improved Process of Recovering Potassium Chlorid from Alkaline Deposits, of which the following is a specification.

Our invention relates to the recovery of potassium chlorid in a commercially pure state from natural alkaline deposits in which it is contained together with sodium carbonate, sodium sulfate, sodium chlorid and borax as in the well known Searles Lake brine.

Heretofore, it has been assumed that in order to effect the recovery of other constituents of value from such a brine the sodium carbonate present should first be converted into an insoluble form and thus removed from the solution.

We have found, however, that not only can the sodium carbonate present be largely caused to precipitate out as such by heating and concentrating the brine, but also that its presence to the saturation point at high temperature is even desirable in effecting the separate recovery of the potassium chlorid since it prevents the precipitation of potassium salts in any form, such as potassium sulfate or glaserite, until the solution becomes saturated with potassium chlorid at the high temperature. The reason for this probably is, though we do not rest our invention upon the theory, that when sodium carbonate is present in sufficient quantity, as it is in the Searles Lake brine, a double salt is formed with the sulfate which is thus practically entirely precipitated as such, thus preventing the formation of either potassium sulfate or glaserite. In brines deficient in sodium carbonate the same result can be obtained by adding sodium carbonate to the brine. Moreover, when such a brine containing with sodium carbonate boric acid, or any of its less soluble salts, as the tetraborate, is heated so as to remove carbon dioxid, sodium metaborate ($NaBO_2$) is formed which is much more soluble than potassium chlorid and hence remains in solution when a solution containing the two is cooled so as to precipitate out the potassium chlorid.

Based upon these facts our process consists in first heating the brine with all its original salt content to evaporate and concentrate the same. Such concentration should be effected at a relatively high temperature, say about 50° C., so as to leave a wide margin for subsequent cooling. The range of permissible temperature is, however, very considerable and it may with advantage be carried even as high as 100° C., or higher. Through the heating of the solution at a high temperature boric acid and less soluble boric acid salts present are caused to react with the sodium carbonate forming more soluble sodium metaborate, and as the concentration proceeds a large proportion of the sodium carbonate, sodium sulfate, and sodium chlorid present is precipitated out. The concentration is carried to the point where the solution is approximately saturated with potassium chlorid at the temperature employed, when it is stopped and the precipitated salts are filtered out. No appreciable quantity of potassium either as potassium sulfate or glaserite is precipitated but the potassium content of the brine remains in solution as potassium chlorid. The solution is then cooled to approximately 20° C. when pure potassium chlorid precipitates, the sodium metaborate remaining in solution.

In this manner a recovery of practically pure potassium chlorid is effected. In order to recover the potassium chlorid remaining in the mother liquor this is mixed with the succeeding batch of brine to be treated. As the sodium metaborate content of the mother liquor increases in successive batches it should be drawn off from time to time before reaching the saturation point, and treated in any usual or suitable manner for the precipitation of borax therefrom after which it can be again returned to the brine.

In the manner described we are able to effect a practically complete recovery of the potassium content of such a brine in the shape of commercially pure potassium chlorid in a simple and economical manner, the advantages of which will be readily understood by those skilled in the art.

While we have described the process as applied to alkaline brines it will be understood that solid deposits of salts can be treated in the same manner by forming a solution thereof in water.

What we claim as new and desire to secure by Letters Patent is:

1. The process of recovering potassium chlorid from alkaline brines containing sodium carbonate which consists in concentrating the brine at a high temperature, then filtering out the precipitated less soluble sodium salts leaving potassium chlorid and the boric acid content of the brine in solution and finally cooling so as to precipitate only potassium chlorid while leaving the boric acid content of the brine in solution to be subsequently recovered.

2. The process of recovering potassium chlorid from alkaline brines containing sodium carbonate which consists in heating and concentrating the brine so as to convert boric acid and boric acid salts present into more soluble sodium metaborate and precipitate less soluble sodium salts while leaving the potassium content of the brine in solution, then filtering out the precipitated salts and cooling the solution to precipitate potassium chlorid.

3. The process of recovering potassium chlorid from alkaline brines containing sodium carbonate which consists in heating and concentrating the brine so as to convert boric acid and boric acid salts present into more soluble sodium metaborate and precipitate less soluble sodium salts while leaving potassium chlorid in solution, filtering out the precipitated sodium salts and then cooling the solution to precipitate potassium chlorid and finally returning the mother liquor to the brine to effect a further recovery of potassium chlorid.

4. The process of recovering potassium chlorid from alkaline brines containing sodium carbonate which consists in heating and concentrating the brine so as to convert boric acid and boric acid salts present into more soluble sodium metaborate and precipitate less soluble sodium salts while leaving the potassium content of the brine in solution and continuing the concentration until the solution is saturated with potassium chlorid at the temperature employed, removing the precipitated sodium salts and then cooling to precipitate potassium chlorid and returning the mother liquor to the succeeding batch of brine to effect a further recovery of potassium chlorid.

5. The process of recovering potassium chlorid from alkaline brines containing sodium carbonate which consists in heating and concentrating the brine so as to convert boric acid and boric acid salts present into more soluble sodium metaborate and precipitate less soluble sodium salts while leaving the potassium content of the brine in solution and continuing the concentration until the solution is saturated with potassium chlorid at the temperature employed, removing the precipitated sodium salts and then cooling to precipitate potassium chlorid leaving sodium metaborate in solution, returning the mother liquor to the succeeding batch of brine and repeating the operation until the mother liquor approaches saturation in sodium metaborate, then precipitating sodium metaborate as borax and again returning the mother liquor to the brine to effect a further recovery of potassium chlorid.

In testimony whereof we have affixed our signatures, this 28th day of August 1916.

LOUIS C. JONES.
FRED L. GROVER.